March 29, 1949.  L. B. COX  2,465,577
TOASTER

Filed Oct. 4, 1944  2 Sheets-Sheet 1

INVENTOR.
LOUIS BENJAMIN COX
BY
Cook & Robinson
ATTORNEYS

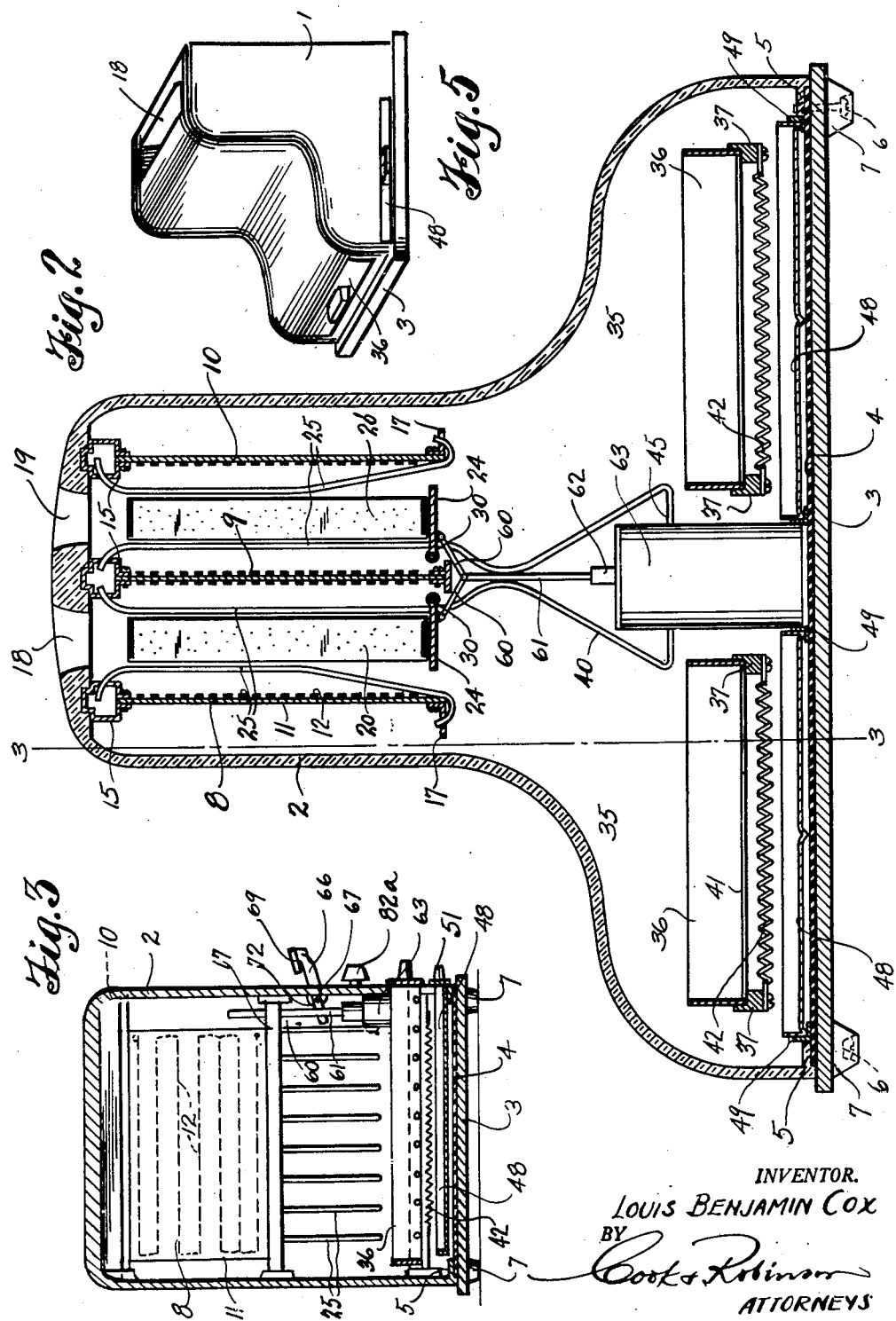

Patented Mar. 29, 1949

2,465,577

UNITED STATES PATENT OFFICE 2,465,577

TOASTER

Louis Benjamin Cox, Seattle, Wash.

Application October 4, 1944, Serial No. 557,124

1 Claim. (Cl. 99—341)

This invention relates to electric toasters and it has reference more particularly to improvements in toasters of that kind designed for the ordinary domestic use of toasting slices of bread; it being the principal object of this invention to provide an electric toaster of a type that may conveniently be used on the breakfast table; which provides for the automatic discharge of toasted slices from the toasting elements, and combines with the bread toasting means, a novel arrangement of warming oven into which the slices of toast will be automatically discharged in order that they may be kept warm until desired for use.

It is also an object of this invention to provide trays in combination with the warming oven for catching crumbs from the toasted bread or for retaining water therein that may be heated by the warming coils to give off steam or moisture whereby to keep the toast moist when such is desired.

Another object of this invention is to provide a toaster of an ornamental character that is easy to keep clean and which has a transparent housing that gives a view of the toasted bread therein.

Still another object of the present invention resides in the provision of devices whereby the timing of the toasting periods may be automatically controlled.

Still further objects of this invention reside in the details of construction of its parts, in their combination and in their mode of operation, as will hereinafter be fully described.

In accomplishing the above mentioned and other objects of the invention, I have provided the improved details of construction, the preferred forms of which are illustrated in the accompanying drawings, wherein—

Fig. 2 is a vertical cross sectional view of the toaster illustrating the relationship of the toasting elements and trays.

Fig. 3 is a vertical section on the line 3—3 in Fig. 2.

Fig. 5 is a view of a device of an alternative form of construction designed for toasting one slice of bread at a time.

Figure 1:
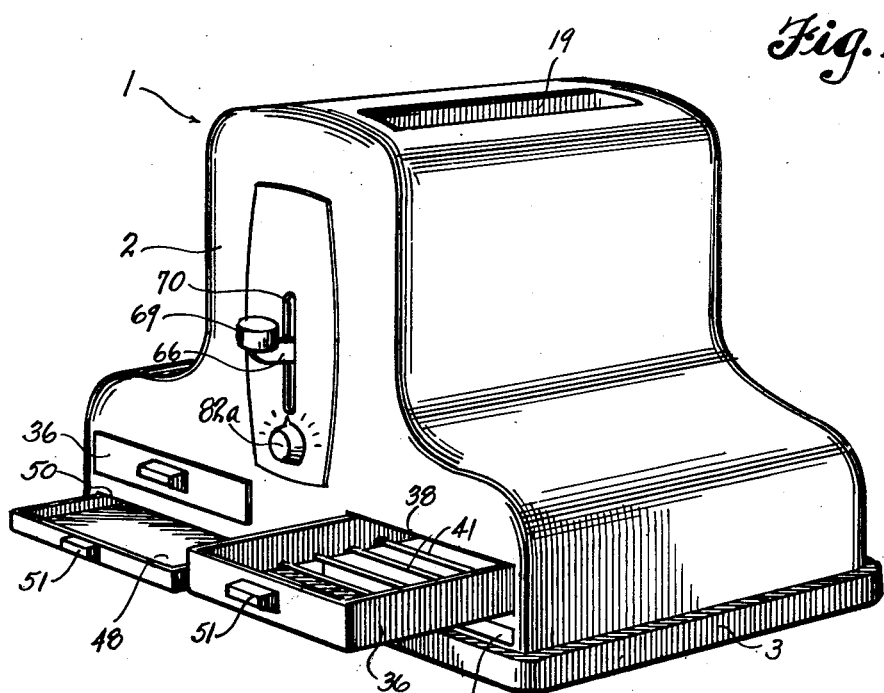
Fig. 1 is a perspective view of an electric toaster embodying therein the features of the present invention.

Referring more in detail to the drawings—

1 designates, in its entirety, the present preferred form of electric toaster, which is designed to toast two slices of bread at a time. As shown best in Figs. 2 and 3, this toaster comprises a one-piece enclosing top housing 2, which preferably would comprise a suitable transparent, plastic material, molded or pressed into the desired shape, and through which the user could easily observe the toasting operation, or note whether or not there was any toasted bread in the trays. However, this feature of employing a transparent housing, is not a requirement for the successful use of the present toaster, and it is anticipated that the housing might also be made of metal as is the usual present-day toaster. In either case, the housing will retain heat within the same and facilitate both the toasting and warming operations.

The housing 2 is supported upon a horizontal base plate 3, which may be made of any suitable material, either plastic, wood or metal. Overlying this plate is a sheet 4 of non-conductive, insulating material that protects the base against heat as well as being non-conductive of electric current.

As noted in Fig. 2, the housing 2 is formed about the periphery of its base edges with an inturned, horizontal flange 5 that overlies the edges of the insulating sheet, and screws 6, which are applied upwardly through the base to attach the four corner legs 7 thereto, are extended upwardly through this flange, thus serving also to secure the housing and base together.

Supported within the upper, central portion of the housing 2 are three parallel, spaced apart heating elements, designated generally by numerals 8, 9 and 10. Each element comprises a flat mounting plate 11 of any suitable material on the face of which a suitable electrically conductive resistance wire 12 formed in back and forth loops is mounted. The central element of this assembly, as noted in Fig. 2, has the heating coils or loops 12 arranged on both its sides, while the two outer elements have the coils only on the inner faces of the plates. These coils, or heating elements, are all connected in parallel in an electric circuit, as presently described, and all are energized or de-energized at the same time.

The plates 11 of the heating elements are supported in place in the toaster, each by its attachment along its top edge to a metal cross member 15. These cross members are here shown as being of tubular cross sectional form, and each has its end portions contained in recesses, or sockets 16 formed in the housing walls and secured by screws if necessary. Likewise, the lower edges of the plates 11 are fixed to cross bars 17 which are secured at their ends to the end walls of the housing, as noted in Fig. 3. Between the three elements are the two toasting chambers, and entrance to these is through slots 18 and 19 in the top wall of the housing, as shown in Fig. 2.

This particular form of toaster is intended to toast two slices of bread at a time and in Fig. 2, I have indicated the two slices of bread at 20 and 20' as disposed in the toasting chambers. Each of the bread slices is held in toasting position upon a supporting plate 24 and is held spaced a proper interval from the heating elements between spaced groups or banks of guide wires 25. As noted in Fig. 2, the wires 25 are fixed at their upper and lower ends respectively in corresponding cross bars 16 and 17, and they are arranged to hold the bread slices in proper spacing from the elements for toasting.

The supports 24 comprise flat, horizontally disposed plates of metal, located within the lower, or discharge ends of the two toasting chambers. Each plate has a hinge shaft 30 affixed thereto along its inner longitudinal edge, which shaft is pivoted in supports at its ends, and these supports are fixed to the toaster walls. This permits the plates to swing downwardly from the full line horizontal positions of Fig. 2, to discharge the toasted slices therefrom into the lower warming compartment of the housing. Release of the plates is by automatic means presently described.

Fig. 2 best shows that the upper part of the housing 2 is restricted in width to that required for the three heating elements and the toasting compartments, but the lower part of the housing flares outwardly to opposite sides and thus provides, at opposite sides of the central portion, the compartments 35. In each of these compartments is a horizontal tray 36 supported in position to receive the toasted slices as dropped from the toasting chambers. Each of the trays is supported on horizontal guide rails 37 which extend between the opposite end walls of the housing. These trays may be pulled outwardly from the housing through openings 38 provided therefor in the forward end wall of the housing, as illustrated in Fig. 1.

The toasted slices of bread, when released from the toasting chambers, drop directly downward, against banks of laterally directed guide wires 40, and are thereby deflected into the horizontal trays to lay flatly therein. The bottoms of these trays preferably are formed by spaced, cross wires 41, and beneath the trays are heating elements in the form of resistance coils 42 supported from the guide rails 37 on which the trays are supported.

The guide wires 40 may be continuations of the inside guide wires 25 applied to support the bread slices from the central heating elements, and preferably would be arranged as has been illustrated in Fig. 2, which shows wires of the two banks joined across their lower ends by cross wires 45.

Beneath each heating coil 42 and corresponding toast receiving tray, is a shallow crumb tray 48, slidably on supporting guides 49 fixed on the base. These trays are adapted to be moved from and into the housing through openings 50 in the end wall. The various trays are equipped at their outer ends with suitable handles as at 51, preferably of an ornamental character.

Figure 4:
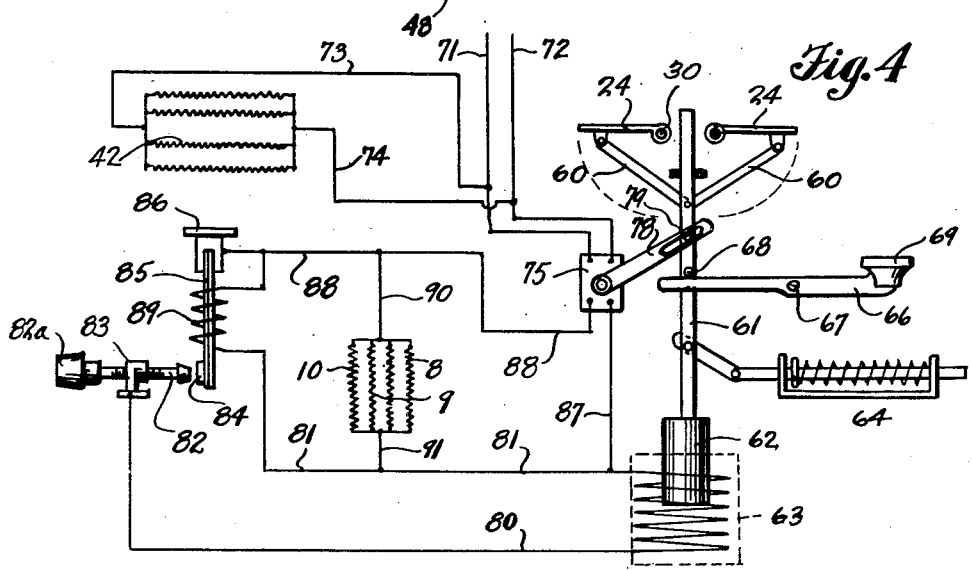
Fig. 4 is a diagrammatic view of the control devices and electrical circuits.

The means for determining and controlling the time interval for toasting, and the means for resetting the toast releasing mechanism, is shown diagrammatically in Fig. 4, wherein it is illustrated that the two plates 24 for supporting the bread slices in the toasting chambers, are connected by operating links 60 with the upper end portion of a push rod 61 in a manner whereby upward and downward movement of the rod will cause the plates to be swung on their pivotal hinge supports, between horizontal supporting position, as in Fig. 2, and the depending, discharge position in which they are shown in dotted lines in Fig. 4. The rod 61 is suitably guided, and its lower end is connected to the core 62 of a solenoid designated generally at 63. When the push rod is lifted by manual means presently described, the plates 24—24 are swung upwardly to horizontal position and are held there yieldingly by a spring pressed toggle linkage 64 seen in Fig. 4. The means provided for manually setting or lifting the plates is also illustrated in Fig. 4 wherein it is noted that a horizontally directed push lever 66 is pivotally supported between its ends on a horizontal pivot shaft 67. One end of the lever 66 engages in lifting contact with a pin or lug 68 on the push rod 61 and the outer end of the lever has a push button 69 thereon. As seen in Fig. 1, the outer end of the lever 66 extends through a vertical slot 70 in the end wall of the housing, and the pivot shaft 67, as seen in Fig. 3, is held within the housing by a supporting bracket 72. The toggle linkage 64 yieldingly urges the push rod to its upper or lower limit of travel as soon as the toggle linkage is moved past a dead center position.

The several toasting elements 8, 9 and 10 are connected in parallel in an electric circuit. Current is supplied to the toaster through circuit wires 71 and 72 (Fig. 4) which connect respectively to one side of a switch 75. Wires 73 and 74 lead from wires 71 and 72 respectively, to supply current to the warming oven elements 42. It is to be understood that the circuit wires 71 and 72 (Fig. 4) may be those of the usual extension cord equipped with the usual plug at the outer end that may be plugged into a wall outlet of a supply circuit. Thus, when the cord is plugged in, the circuits through the heating elements will be closed and the warming compartments become warmed.

At the start of a toasting operation, after the toaster has been plugged in, the user depresses the thumb piece 69 of the setting lever 66 and this lifts the rod 61 upwardly and sets the plates 24—24 in position for holding slices of bread in the toasting chambers. The rod 61 is held as set by the spring pressure of the toggle 64. The switch 75 has a switch lever 78 operatively connected to the rod 61 by pin and slot connection at 79, and when the rod 61 is lifted upwardly, the lever moves to close a circuit through the switch.

As noted in Fig. 4, the solenoid 63 has circuit connections indicated at 80 and 81. The wire 80 supplies current to an adjustable contact member 82 mounted in a support 83. This contact element is cooperatively associated with a contact element 84 on a thermostatic bi-metal strip 85 mounted in a support 86.

Circuit wires 87 and 88 lead from the switch 75 to the wire 81 and to the thermostatic element 85 respectively, through which latter an electrical circuit is completed to the contact element 84. Also, there is a resistance coil 89 for heating the thermostatic strip 85 and this connects to wires 81 and 88. The several sets of resistance coils of the toasting elements 8, 9 and 10 are connected across the wires 81 and 88 by circuit connections 90 and 91.

Thus, when the outer end of push lever 66 is depressed to lift the plates 24 to position for supporting the slices of bread for toasting, it also actuates the switch 75 from "open" to "on" position and closes the circuit to wires 87 and 88, and this causes energization of elements 8, 9 and 10. Also, it energizes the element 89. The current in coil 89 gradually heats the strip 85 and causes it to warp into position to engage contact 84 with contact 82, thus to finally complete the circuit through the solenoid 63.

The adjustment of the element 82 from or toward the element 84, is such as to determine the toasting interval. The element 82 is on a threaded shaft applied through the support 83. On the outer end of the shaft is a button 82a for making the adjustment, and this button is exposed at the outside of the toaster as seen in Fig. 1.

When the solenoid 63 becomes energized, the core 62 is magnetically pulled down and this throws the switch 75 to "off" position and swings the plates 24 downwardly to drop the slices of toast into the receiving trays. This de-energizes the coil of the thermostatic element 89 and allows the contacts 84 and 82 to separate to again open the solenoid circuit. To reset the device, the lever 66 is depressed and this again places the plates in position for supporting slices of bread in toasting position.

When it is desired to use the toasted slices, the trays 36 are drawn out and the toast removed, but so long as it is in the toaster, it will be kept warm by reason of its proximity to the warming coils 42.

The device shown in Fig. 5 is designed for the toasting of bread one slice at a time. It is constructed like that device of Fig. 2, except that it embodies only the parts required to accommodate one slice instead of two. The toast and crumb trays in this type preferably are to be drawn out from the side instead of the end.

Having thus described my invention, what I claim as new therein and desire to secure by Letters Patent is:

A toaster comprising a transparent housing forming, in its upper portion, an enclosed toasting chamber equipped with a vertical guideway adapted to receive at its upper end and contain a slice of bread in vertical position therein for toasting, a warming oven in the lower portion of the housing and laterally offset from the plane of the vertical guideway, an inspection tray in the warming oven movable into and from the housing and adapted to receive and contain a slice of toast in horizontal position therein and visible through said transparent housing, a trap door at the lower end of the vertical guideway for supporting a bread slice therein for toasting, means for holding the door in functional position and for moving it for release of the toasted slice for gravity discharge, and wires forming a laterally and downwardly inclined slide for guiding a slice of toast, when released from the toasting chamber, into a horizontal position in the said inspection tray, and electrical heating elements at opposite sides of the vertical guideway and in the warming oven.

LOUIS BENJAMIN COX.

REFERENCES CITED

The following references are of record in the file of this patent:

UNITED STATES PATENTS

| Number | Name | Date |
| --- | --- | --- |
| 1,522,818 | Grouleff et al | Jan. 13, 1925 |
| 1,529,342 | Christy | Mar. 10, 1925 |
| 1,696,613 | Shroyer | Dec. 25, 1928 |
| 1,720,800 | Morrison | July 16, 1929 |
| 1,731,402 | Thornton | Oct. 15, 1929 |
| 1,807,312 | Henley | May 26, 1931 |
| 1,821,226 | Mabey | Sept. 1, 1931 |
| 1,841,301 | Schroeder et al | Jan. 12, 1932 |
| 1,847,529 | Harrington | Mar. 1, 1932 |
| 1,942,835 | Rutenber | Jan. 9, 1934 |
| 1,948,739 | Wolcott et al | Feb. 27, 1934 |
| 2,223,486 | Filbren | Dec. 3, 1940 |
| 2,236,402 | Gomersall | Mar. 25, 1941 |
| 2,368,440 | Barker | Jan. 30, 1945 |